United States Patent
Krishnamurthy et al.

(10) Patent No.: US 9,792,242 B2
(45) Date of Patent: Oct. 17, 2017

(54) SYSTEMS AND METHODS FOR NON-UNICAST/DESTINATION LOOKUP FAIL (DLF) LOAD BALANCING

(71) Applicant: DELL PRODUCTS L.P., Round Rock, TX (US)

(72) Inventors: Karthik Krishnamurthy, Chennai (IN); Ramasubramani Mahadevan, Chennai (IN)

(73) Assignee: DELL PRODUCTS LP, Round Rock, TX (US)

( * ) Notice: Subject to any disclaimer, the term of this patent is extended or adjusted under 35 U.S.C. 154(b) by 282 days.

(21) Appl. No.: 14/565,248

(22) Filed: Dec. 9, 2014

(65) Prior Publication Data

US 2016/0162429 A1    Jun. 9, 2016

(51) Int. Cl.
| | | |
|---|---|---|
| *G06F 13/40* | (2006.01) | |
| *H04L 12/931* | (2013.01) | |
| *H04L 12/721* | (2013.01) | |
| *H04L 12/761* | (2013.01) | |
| *H04L 12/709* | (2013.01) | |

(52) U.S. Cl.
CPC ...... *G06F 13/4045* (2013.01); *G06F 13/4022* (2013.01); *G06F 13/4068* (2013.01); *H04L 45/16* (2013.01); *H04L 45/245* (2013.01); *H04L 45/44* (2013.01); *H04L 49/201* (2013.01); *H04L 49/70* (2013.01)

(58) Field of Classification Search
None
See application file for complete search history.

(56) References Cited

U.S. PATENT DOCUMENTS

| | | | | |
|---|---|---|---|---|
| 8,369,296 | B2* | 2/2013 | Armstrong | H04L 45/245 370/338 |
| 8,792,494 | B2* | 7/2014 | Angst | H04L 45/7453 370/392 |
| 8,989,193 | B2* | 3/2015 | Angst | H04L 45/7453 370/392 |
| 9,077,650 | B2* | 7/2015 | Budhia | H04L 49/253 |
| 9,225,549 | B2* | 12/2015 | Christenson | H04L 12/4641 |
| 2009/0225752 | A1* | 9/2009 | Mitsumori | H04L 45/245 370/390 |
| 2011/0261827 | A1* | 10/2011 | Armstrong | H04L 45/245 370/401 |
| 2012/0307828 | A1* | 12/2012 | Agarwal | H04L 49/70 370/392 |
| 2013/0044641 | A1* | 2/2013 | Koponen | H04L 12/66 370/255 |

(Continued)

OTHER PUBLICATIONS

'IEEE Standard for Local and metropolitan area networks—Virtual Bridged Local Area Networks—Bridge Port Extension,' IEEE Computer Society, Jul. 16, 2012.*

(Continued)

*Primary Examiner* — Steven Snyder
(74) *Attorney, Agent, or Firm* — North Weber & Baugh LLP

(57) ABSTRACT

Aspects of the present invention include a port extender environment using the port extenders to dynamically select a data path. In embodiments of the present invention, each port extender can communicate data traffic to another port extender or to a host receiver. The communication path is selected in the port extender using a hashing system.

20 Claims, 6 Drawing Sheets

(56) References Cited

U.S. PATENT DOCUMENTS

| | | | | |
|---|---|---|---|---|
| 2013/0114619 | A1* | 5/2013 | Wakumoto | H04L 12/4641 370/406 |
| 2013/0242991 | A1* | 9/2013 | Basso | H04L 45/16 370/390 |
| 2013/0242992 | A1* | 9/2013 | Basso | H04L 45/16 370/390 |
| 2013/0242993 | A1* | 9/2013 | Basso | H04L 45/16 370/390 |
| 2013/0322457 | A1* | 12/2013 | Budhia | H04L 49/253 370/401 |
| 2014/0036924 | A1* | 2/2014 | Christenson | H04L 12/4641 370/395.53 |
| 2014/0079061 | A1* | 3/2014 | Angst | H04L 45/7453 370/392 |
| 2014/0079064 | A1* | 3/2014 | Angst | H04L 45/7453 370/392 |
| 2014/0153570 | A1* | 6/2014 | Balakavi | H04L 45/7453 370/390 |
| 2014/0156906 | A1* | 6/2014 | Babu | G06F 13/4027 710/316 |
| 2014/0198656 | A1* | 7/2014 | Venkatesh | H04L 47/125 370/235 |
| 2014/0241374 | A1* | 8/2014 | Krishnamurthy | H04L 45/245 370/401 |
| 2014/0269710 | A1* | 9/2014 | Sundaram | H04L 45/302 370/392 |
| 2015/0163072 | A1* | 6/2015 | Kalkunte | H04L 12/4633 370/392 |
| 2015/0195178 | A1* | 7/2015 | Bhattacharya | H04L 45/745 718/1 |
| 2015/0256405 | A1* | 9/2015 | Janardhanan | H04L 41/12 370/255 |
| 2015/0271105 | A1* | 9/2015 | Budhia | H04L 49/253 370/392 |
| 2015/0312151 | A1* | 10/2015 | Krishnamurthy | H04L 45/04 370/389 |
| 2016/0105379 | A1* | 4/2016 | Murthy | H04L 49/3009 370/392 |
| 2016/0124884 | A1* | 5/2016 | Agarwal | H04L 1/22 710/306 |
| 2016/0134535 | A1* | 5/2016 | Callon | H04L 45/48 370/390 |

OTHER PUBLICATIONS

'IEEE 802.1Q—Media Access Control Bridges and Virtual Bridged Local Area Networks' by Patricia Thaler et al., Mar. 10, 2013.*
'AT-GS950/24 Web Users Guide' Copyright, 2011 Allied Telesis, Inc.*
'Datacenter Network Infrastructure' by Petr Grygárek, copyright 2009.*
'Introduction to Port Extension (IEEE P802.1Qbh)' by J. Pelissier and R. Raeber, In ITC 22 Second Workshop on Data Center—Converged and Virtual Ethernet Switching (DC CAVES), Sep. 2010.*
'SCALANCE XM-400/XR-500 Web Based Management Configuration Manual' by Siemens, copyright Mar. 2014.*

* cited by examiner

SYSTEMS AND METHODS FOR NON-UNICAST/DESTINATION LOOKUP FAIL (DLF) LOAD BALANCING

BACKGROUND

Field of Invention

The present invention relates generally to data communication networks and devices, and relates more particularly to .1BR network environments.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As information handling systems provide increasingly more central and critical operations in modern society, it is important that the networks are reliable. One method used to improve reliability is to provide redundant links between network devices. By employing redundant links, network traffic between two network devices that would normally be interrupted can be re-routed to the back-up link in the event that the primary link fails.

In a network switch, there are a limited number of ports and each switch is managed individually. This complicates the management of switches within the network. One way to decrease the complexity in management of switches and increase the number of ports is to use port extenders. Port extension provides the capability to group different switches into a single logical switch, thus making it easier to manage different switches and also increases the number of ports which can be managed. In a port extender environment, a single controlling point is needed to manage the different switches and these managed switches are called the port extenders.

In some prior art solutions, a controlling bridge (CB) is used as the controlling point in a .1BR network. In prior art solutions, the controlling bridge statically selects the path through the port extenders.

In .1BR enabled virtual machine (VM) switched networks, load balancing of non-unicast/destination lookup fail (DLF) traffic either in the fabric or for the virtual port-link aggregation group (VP-LAG) cannot be handled by the controlling bridge itself. The prior art solutions choose a link aggregation group (LAG) member for a VP-LAG upfront in the control plane of the controlling bridge and hence it only achieves static load balancing.

In a multi-level port extender (PE) environment, the path to reach the port extender from the controlling bridge is also statically chosen in the control plane for non-unicast traffic. Hence it is subjected to only static load balancing.

FIG. 1 shows an example of a prior art solution. FIG. 1 shows controlling bridge 110, four port extenders 120, 130, 140, and 150, two hosts 160 and 170. The hosts 160 and 170 are the receivers of the information. The fabric links between controlling bridge and port extenders can be enabled with .1BR. The controlling bridge discovers all the port extenders through IEEE 802.1BR standard mechanism.

For unicast traffic, paths to reach port extender 3 140 and port extender 4 are considered as equal cost multi path (ECMP) paths and hence the controlling bridge 110 can dynamically load balance the traffic via port extender 1 120 or port extender 2 130. However, for non-unicast or destination lookup fail traffic, the controlling bridge load balancing is only static.

There are different paths, for example, to reach host 1 160 a path is through PE1 120 and PE3 140 or PE1 120 and PE4 150. There is also a path through PE2 130 and PE3 140 or PE2 130 and PE4 150. There are four possible paths. The prior art selects a path statically and programs the path to the port extenders 120, 130, 140, and 150.

For non-unicast traffic LAG hashing, the packet fields are used to compute a hashing scheme and the same is passed as a metadata in the packet to all other units via stack links. For a given hash index, only 1 port is opened up for the LAG, whereas for the same hash index, in other stack units all the local ports for that LAG is blocked. Thus, the LAG hashing occurs for non-unicast traffic.

One disadvantage of this system is that static load balancing of VP-LAG members, as well as path to reach a given multi-level port extender, leads to inefficient load balancing.

Another disadvantage of this system is that static load balancing of VP-LAG members, as well as path to reach a given multi-level port extender, leads to oversubscription of channel members.

Accordingly, what is needed are systems and methods that can achieve dynamic load balancing of non-unicast traffic.

BRIEF DESCRIPTION OF THE DRAWINGS

Reference will be made to embodiments of the invention, examples of which may be illustrated in the accompanying figures, in which like parts may be referred to by like or similar numerals. These figures are intended to be illustrative, not limiting. Although the invention is generally described in the context of these embodiments, it should be understood that it is not intended to limit the spirit and scope of the invention to these particular embodiments. These drawings shall in no way limit any changes in form and detail that may be made to the invention by one skilled in the art without departing from the spirit and scope of the invention.

DESCRIPTION OF THE PREFERRED EMBODIMENTS

Figure 1:
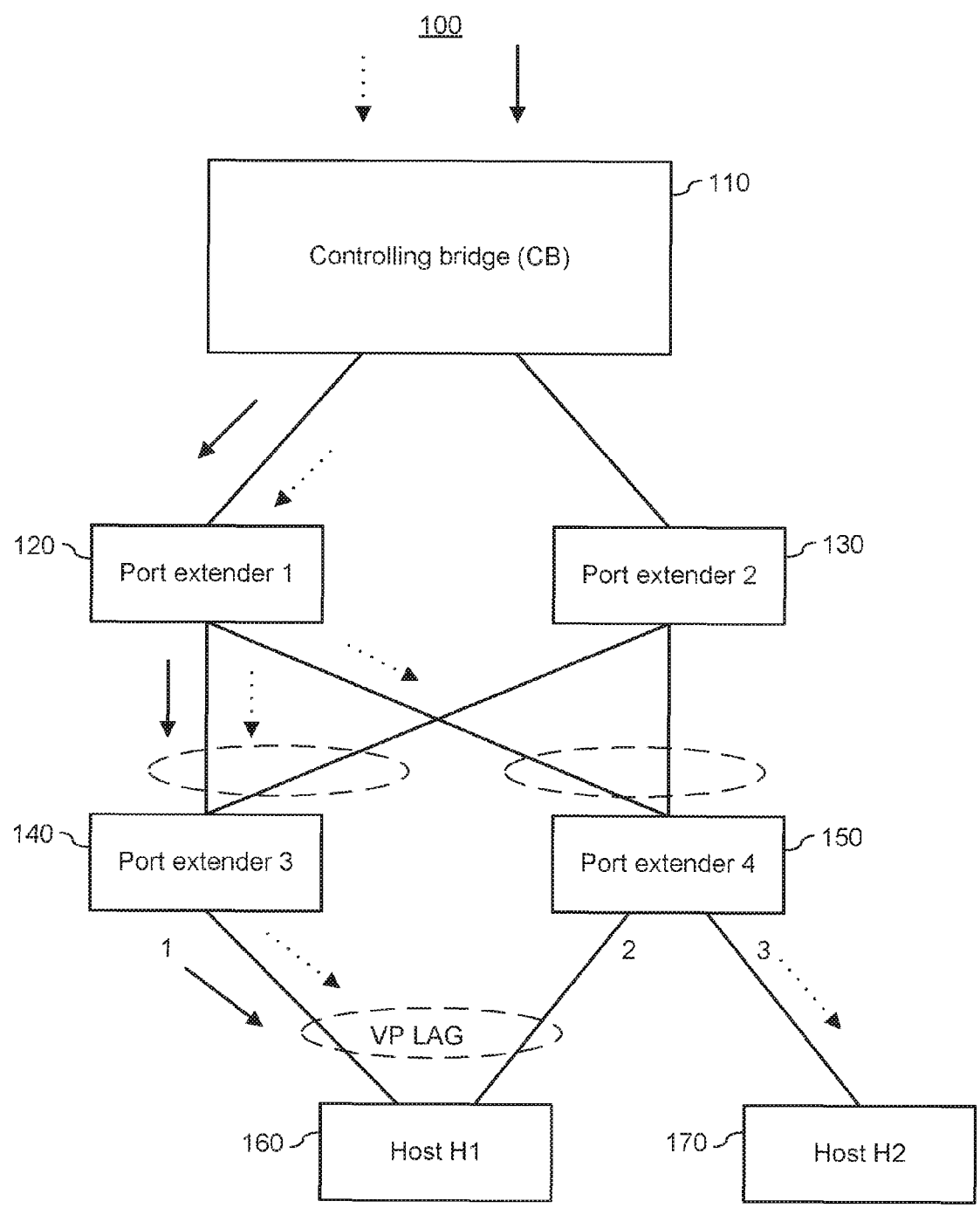
FIG. 1 depicts an example of a port extender environment.

In the following description, for purposes of explanation, specific examples and details are set forth in order to provide an understanding of the invention. It will be apparent, however, to one skilled in the art that the invention may be practiced without these details. Well known process steps may not be described in detail in order to avoid unnecessarily obscuring the present invention. Other applications are possible, such that the following examples should not be taken as limiting. Furthermore, one skilled in the art will recognize that aspects of the present invention, described herein, may be implemented in a variety of ways, including software, hardware, firmware, or combinations thereof.

Components, or modules, shown in block diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components or modules.

Furthermore, connections between components within the figures are not intended to be limited to direct connections. Rather, data between these components may be modified, re-formatted, or otherwise changed by intermediary components (which may or may not be shown in the figure). Also, additional or fewer connections may be used. It shall also be noted that the terms "coupled" or "communicatively coupled" shall be understood to include direct connections, indirect connections through one or more intermediary devices, and wireless connections.

In the detailed description provided herein, references are made to the accompanying figures, which form a part of the description and in which are shown, by way of illustration, specific embodiments of the present invention. Although these embodiments are described in sufficient detail to enable one skilled in the art to practice the invention, it shall be understood that these examples are not limiting, such that other embodiments may be used, and changes may be made without departing from the spirit and scope of the invention.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, such phrases in various places in the specification are not necessarily all referring to the same embodiment or embodiments. It shall be noted that the use of the terms "set" and "group" in this patent document shall include any number of elements. Furthermore, it shall be noted that methods or algorithms steps may not be limited to the specific order set forth herein; rather, one skilled in the art shall recognize, in some embodiments, that more or fewer steps may be performed, that certain steps may optionally be performed, and that steps may be performed in different orders, including being done some steps being done concurrently.

The present invention relates in various embodiments to devices, systems, methods, and instructions stored on one or more non-transitory computer-readable media involving the communication of data over networks. Such devices, systems, methods, and instructions stored on one or more non-transitory computer-readable media can result in, among other advantages, better bandwidth usage, better scalability, and better reliability by mitigating the effects of down links and other points of failure across data networks. The terms "packet" or "frame" shall be understood to mean a group of bits that can be transported across a network. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell." One skilled in the art shall recognize that references herein to Media Access Control (MAC) address may, depending upon context, refer to MAC-VLAN combination.

It shall also be noted that although embodiments described herein may be within the context of non-unicast transmission and port extender network environments, the invention elements of the current patent document are not so limited. Accordingly, the invention elements may be applied or adapted for use in other contexts. Non-unicast transmission include broadcast, multicast, and unknown unicast transmissions.

As described above, in prior art solutions, in a multi-level port extender (PE) environment, the path to reach the port extender from the controlling bridge is also statically chosen in the control plane for non-unicast traffic. Hence it is subjected to only static load balancing.

In one embodiment, different sets of port extenders are emulated either leading to a downstream port extender or to a host as virtual Trunk Egress members and program the tables in corresponding port extenders appropriately.

The controlling bridge can provide the list of all port extender ports, which are treated as the virtual LAG from a forwarding point of view, to a given downstream port extender or host to each of those intended port extenders. Port extenders use this information to program the hash based non-unicast table in such a way that for a given hash only 1 port is allowed for non-unicast traffic and other port is blocked for the same hash. This logic works regardless of whether the other ports are in the same port extender or different sets of port extenders.

For different hash indexes, different sets of port extenders ports are opened up for non-unicast/DLF traffic.

Figure 2:
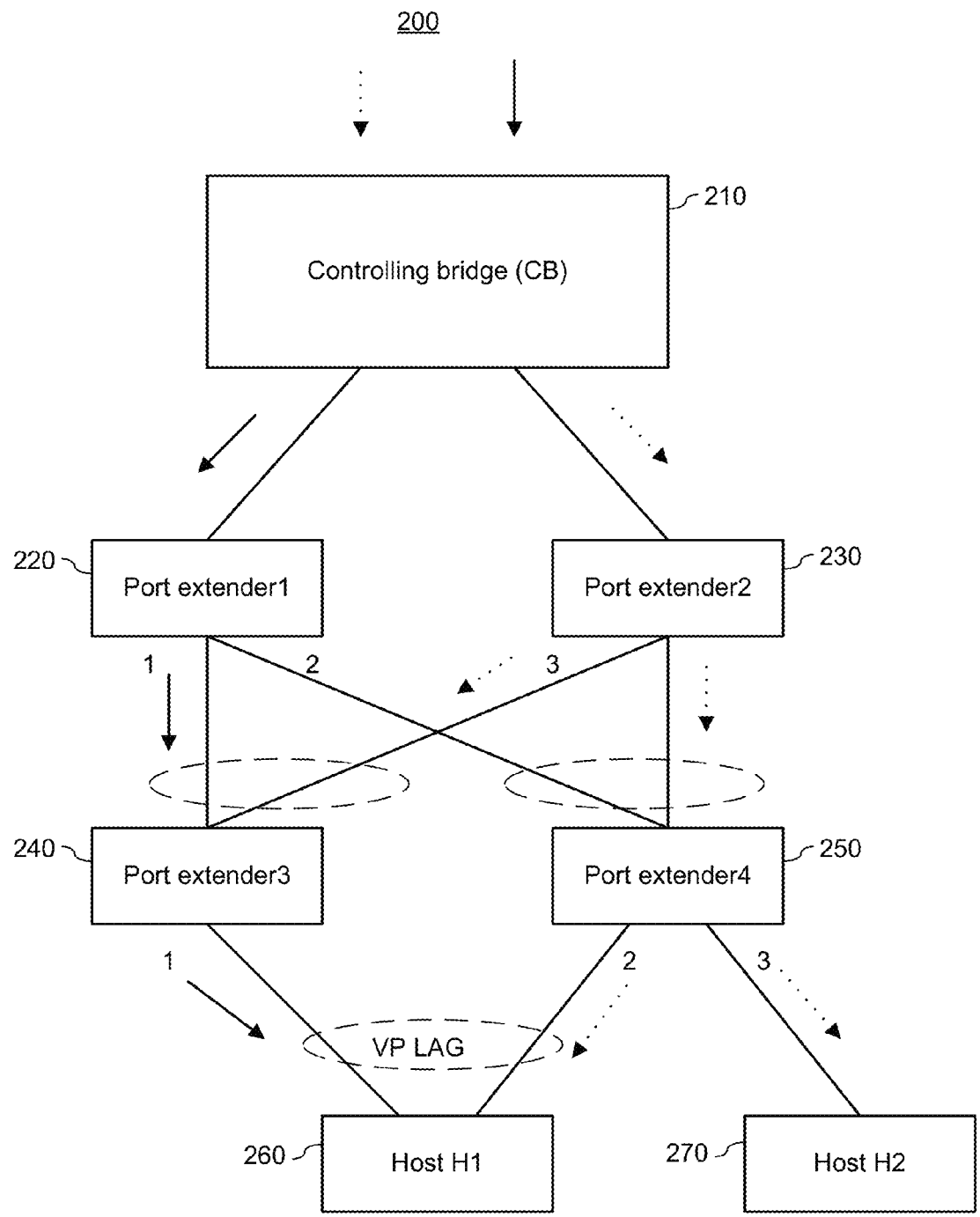
FIG. 2 depicts an example of a network in a port extender environment according to embodiments of the present invention.

FIG. 2 depicts an example of a network 200 in a port extender environment according to embodiments of the present invention. FIG. 2 shows a controlling bridge 210, four port extenders 220, 230, 240, and 250, and two hosts 260 and 270. While FIG. 2 depicts a 2 level port extender environment, it shall be understood by those of skill in the art that the concepts apply to an n-level port extender environment.

The fabric links between the controlling bridge 210 and port extenders 220, 230, 240, and 250 can be enabled with .1BR. The controlling bridge 210 can discover all the port extenders 220, 230, 240, and 250 through an IEEE 802.1BR standard mechanism. Any other standard mechanism can also be used.

For unicast traffic, the path to reach port extender 3 240 and port extender 4 250 are considered as equal cost multi path (ECMP) paths and hence the controlling bridge 210 can dynamically load balance the traffic via port extender 1 220 or PE2 230.

However, for non-unicast or DLF traffic, the restriction of controlling bridge 210 is not able to load balance and is overcome by pushing the dynamic load balancing to the port extender which can do LAG hashing for its port extender ports. In this Figure, there are two flows, shown in the figure using solid and dashed arrows. The two flows have different packet fields so the controlling bridge 210 would send the packet to the port extenders 220, 230, 240, and 250. Each port extender 220, 230, 240, and 250 would independently calculate the hash index. Only one of the flows would be allowed across the port extender 220, 230, 240, and 250. In this example, port extender 1 220 to port extender 3 240 can be used to reach VP-LAG. Port extender 1 220 would not forward the packet to port extender 4 250.

In one embodiment, port extender ports are emulated by either leading to a downstream port extender or to a host as Virtual Trunk Egress members and program the tables in the corresponding port extenders appropriately.

The controlling bridge 210 provides the list of all port extender ports, which are treated as the virtual LAG from a forwarding point of view, to a given downstream port extender 220, 230, 240, and 250 or host to each of those intended port extenders 220, 230, 240, and 250.

In one embodiment, port extenders 220, 230, 240, and 250 use this information to program the hash based non-unicast block/allow table in such a way that for a given hash only 1 port is allowed for non-unicast traffic and other port is blocked for the same hash. This logic works whether the other ports are in the same port extender 220, 230, 240, and 250 or different sets of port extenders 220, 230, 240, and 250.

For different hash indexes, different sets of port extender ports are opened up for non-unicast or DLF traffic. By way of example, port extender 4 250 can be reached either via port extender 1 220 or port extender 2 230. Hence both the local ports of port extender 1 220 (Port 2) and port extender 2 230 (Port 4) leading to port extender 4 250 can be considered as a virtual LAG and egress table is programmed as below:

| Hash index | PE1 |
| --- | --- |
| 0 | Port 2-Allow |
| 1 | Port 2-Block |

| Hash index | PE3 |
| --- | --- |
| 0 | Port 4-Block |
| 1 | Port 4-Allow |

A hash value can be computed using any known hashing scheme with all the packet fields as inputs like Source E-channel identifier (ECID), Destination ECID, Source Media Access Control (MAC), destination MAC, IP fields, User Datagram Protocol (UDP) or Transmission Control Protocol (TCP) port, or any other inputs.

Both the port extenders compute the same hash value as the hash algorithm and the packet fields chosen for hash computation is same.

A similar mechanism can be employed for VP-LAG channel members as well.

Using this embodiment, dynamic load balancing can be achieved for both reaching multi-level port extenders as well as host having VP-LAG to port extenders.

Figure 3:
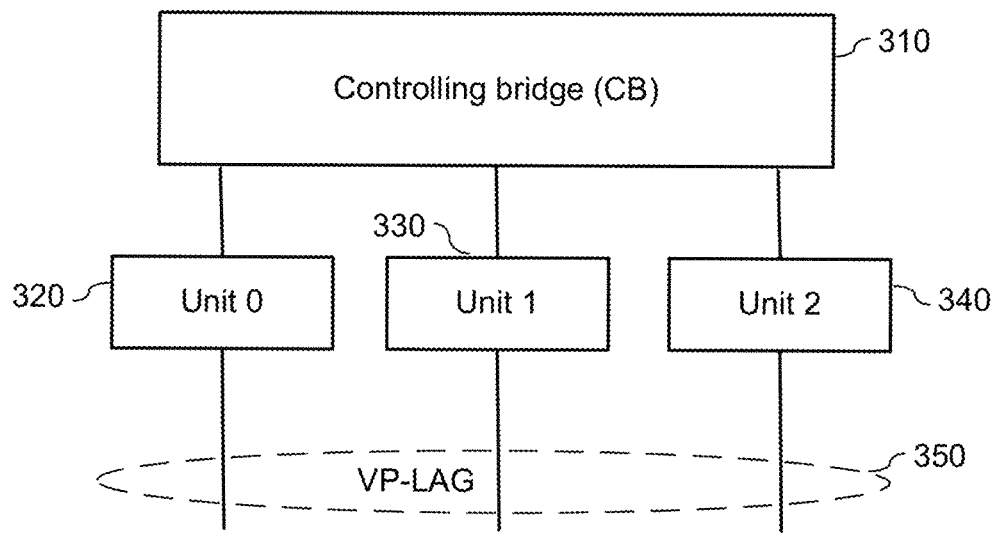
FIG. 3 depicts a controlling bridge coupled to units that comprise tables that may be programmed, according to embodiments of the present invention.

FIG. 3 depicts a controlling bridge coupled to units that comprise tables that may be programmed, according to embodiments of the present invention. FIG. 3 shows a controlling bridge 310, unit 0 320, unit 1 330, unit 2 340, and VP-LAG 350. In the present embodiment, each unit can be a port extender. Also, in the present embodiment, stack links can be removed. Furthermore, normal LAG can be treated as VP-LAG.

The unit 0 table can be programmed as:

| Hash index | Port bitmap |
| --- | --- |
| 0 | Allow-Port 1 |
| 1 | Block-Port 1 |
| 2 | Block-Port 1 |

The unit 1 table can be programmed as:

| Hash index | Port bitmap |
| --- | --- |
| 0 | Block-Port 1 |
| 1 | Allow-Port 1 |
| 2 | Block-Port 1 |

The unit 2 table can be programmed as:

| Hash index | Port bitmap |
| --- | --- |
| 0 | Block-Port 2 |
| 1 | Block-Port 2 |
| 2 | Allow-Port 2 |

The result is same even though the 3 port extender units are not physically stacked together the same behavior for LAG hashing in normal stacking scenarios for non-unicast traffic is achieved.

Figure 4:
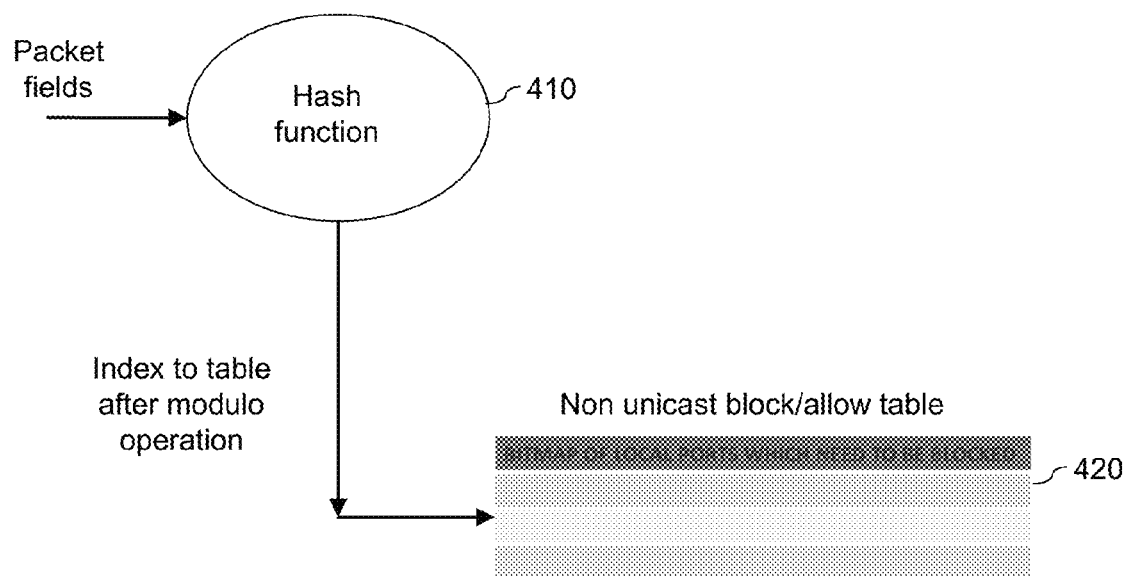
FIG. 4 depicts a non-unicast block/allow table programming according to embodiments of the present invention.

FIG. 4 depicts a non-unicast block allow table programming 400. A port extender can program the block/allow table. FIG. 4 shows the packet fields input to a hashing function 410 and index to table after modulo operation to achieve a non-unicast block/allow table 420.

Figure 5:
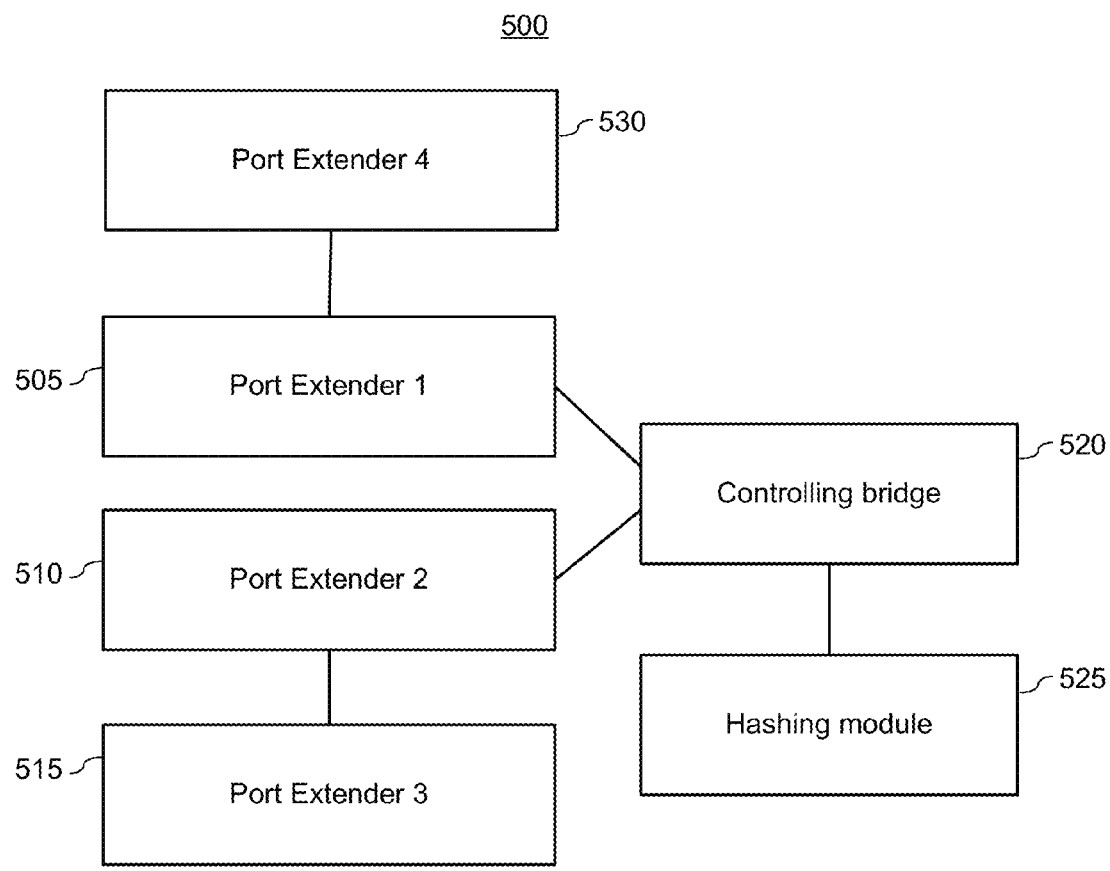
FIG. 5 depicts a block diagram of a system according to the present invention.

FIG. 5 depicts system block diagram 500 in accordance with the present invention. FIG. 5 shows controlling bridge 520, hash module 525, and port extender 1 505, port extender 2 510, port extender 3 515, and port extender 4 530. Hash module 525 can be stored in memory and is used to generate the hash indexes for the block/allow tables. Port extenders, port extender 1 505, port extender 2 510, port extender 3 515, and port extender 4 530 each can block or allow data traffic, thereby dynamically selecting a path through the system. This dynamic path selection permits load balancing for non-unicast/DLF traffic.

Figure 6:
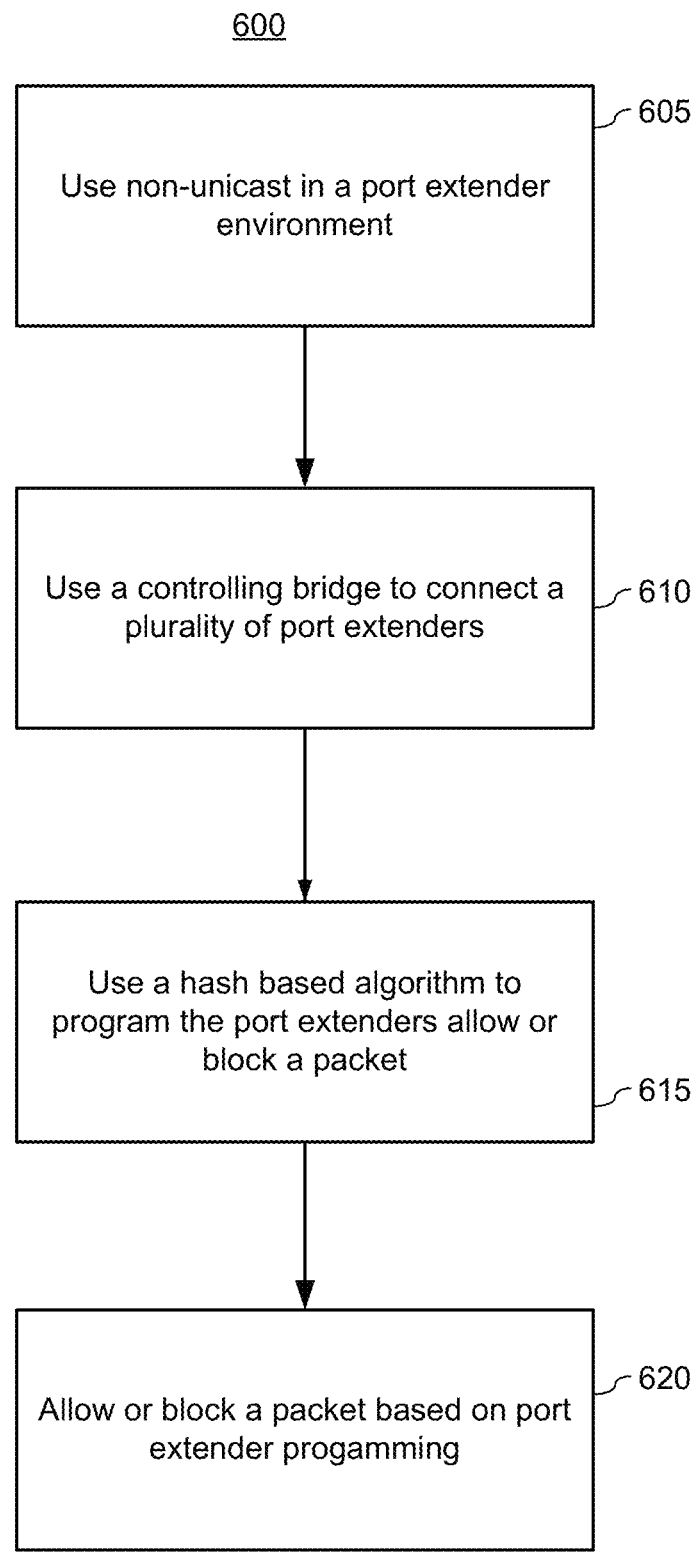
FIG. 6 depicts a flow chart of a method according to the present invention.

FIG. 6 depicts a block diagram of a method 600 in accordance with the present invention. FIG. 6 shows using non-unicast in port extender environment 605, using a controlling bridge to connect a plurality of port extenders 610, using a hash based algorithm to program the port extenders allow or block a packet 615, and allowing or block a packet based on port extender programming 620.

Embodiments of the present invention have many advantages. For example, they allow load balancing in non-unicast or DLF traffic. Other advantages include reduction of over-subscription of channel members.

It shall be noted that aspects of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

While the inventions have been described in conjunction with several specific embodiments, it is evident to those skilled in the art that many further alternatives, modifications, application, and variations will be apparent in light of the foregoing description. Thus, the inventions described herein are intended to embrace all such alternatives, modifications, applications and variations as may fall within the spirit and scope of the appended claims.

What is claimed is:

1. An information handling system in a port extender environment, comprising:
   a host receiver, configurable to connect to at least one port extender environment;
   at least one hash module that uses a hashing system to generate hash indices;
   a plurality of port extenders, configurable to forward data traffic to the host receiver and use the hash indices to program block/allow tables such that, for a given hash index, only one port is allowed to forward non-unicast traffic; and
   a controlling bridge, coupled to the plurality of port extenders, that processes data traffic and receives data from and sends data to at least one of the plurality of port extenders.

2. The information handling system of claim 1 wherein the plurality of port extenders is configured such that a first port extender is coupled to the controlling bridge and a port extender is coupled to a second port extender.

3. The information handling system of claim 2 wherein the second port extender is coupled to the host receiver.

4. The information handling system of claim 2 comprising a plurality of first and second port extenders.

5. The information handling system of claim 2 wherein the controlling bridge provides to the plurality of port extenders a list comprising port extender ports that form a virtual link aggregation group.

6. The information handling system of claim 1 wherein the information handling system is a non-unicast system.

7. The information handling system of claim 1 wherein the information handling system comprises a destination lookup fail system.

8. The information handling system of claim 1 wherein the information handling system comprises a multicast system.

9. The information handling system of claim 1 wherein the information handling system comprises a broadcast system.

10. A method for distributing data traffic to a host receiver in a port extender environment, comprising:
    receiving from a controlling bridge information associated with a plurality of port extender ports; and
    using the information to program a plurality of port extenders based on a hashing system, to dynamically select a path to forward non-unicast traffic from the controlling bridge to at least one of the plurality of port extenders.

11. The method of claim 10 wherein the distribution of data traffic comprises a destination lookup fail system.

12. The method of claim 10 wherein the distribution of data traffic comprises a broadcast system.

13. The method of claim 10 wherein the path is selected by using a block/allow table.

14. The method of claim 13 wherein the block/allow table comprises a set of instructions to block and allow data traffic through a port extender such that for one hash index only one port is allowed to forward non-unicast traffic.

15. The method of claim 13 wherein the block/allow table is indexed based on the hashing system.

16. A port extender comprising:
    a plurality of ports;
    a block/allow table comprising a set of instructions that are used to determine which of the plurality of ports is allowed to forward non-unicast traffic; and
    a hashing module coupled to the block/allow table, the hashing module being used to program the set of instructions.

17. The information handling system of claim 1, wherein the block/allow tables comprise trunk egress tables.

18. The information handling system of claim 1, wherein the plurality of port extenders is emulated as trunk egress members.

19. The information handling system of claim 1 comprising a path from the controlling bridge to the host receiver, the path being dynamically selected from a plurality of possible communication paths based on block/allow tables.

20. The method of claim 10 wherein the information comprises a list of the plurality of port extender ports.

* * * * *